T. MOORE.
Feed Rack.
No. 54,005.
Patented April 17, 1866.
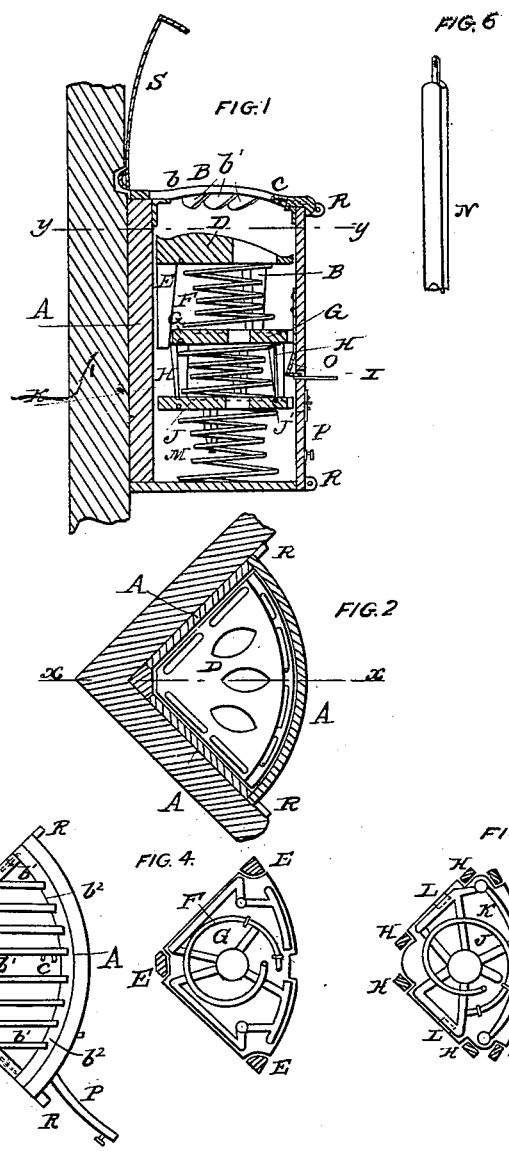

UNITED STATES PATENT OFFICE.

THOMAS MOORE, OF NEW YORK, N. Y.

IMPROVEMENT IN FEEDING HAY-RACKS.

Specification forming part of Letters Patent No. 54,005, dated April 17, 1866.

*To all whom it may concern:*

Be it known that I, THOMAS MOORE, of the city, county, and State of New York, have invented a new and useful Improvement in Horse Hay-Racks; and I do hereby declare that the following is a full, clear, and exact description thereof, which will enable others skilled in the art to make and use the same, reference being had to the accompanying drawings, forming a part of this specification, in which—

Figure 1 is a vertical central section of my improved rack, taken through the line $x\ x$, Fig. 2. Fig. 2 is a horizontal cross-section of the same, taken through the line $y\ y$, Fig. 1. Fig. 3 is a top view of the same. Fig. 4 is a top view of the second table, showing the guides of the first table in section. Fig. 5 is a top view of the third table, showing the guides of the second table in section. Fig. 6 is a side view of a stick for pushing down the tables of the rack.

Similar letters of reference indicate like parts.

My invention has for its object to furnish a rack for feeding hay to horses and other animals which will occupy but little space, will keep the hay always within the reach of the animal feeding, and will prevent waste by compelling the animal to draw out but little at a time; and it consists of a hay-rack constructed and arranged as hereinafter more fully described.

A is the outer case or box of the rack. This case or box is represented in the drawings as being triangular in form, so as to be placed in and fit into the corner of a stall, room, or shed; but it may be made in any shape the circumstances of the place in which it is to be placed may render advisable, and in all cases it should be of such a height that it may stand upon the floor and have its top at the proper height for the animal to take its food easily and comfortably. Upon the top of the box or case A is placed a rack or grate, B. This grate B is made in two pieces and hinged to the upper edges of the sides of the box or case A, as shown in Fig. 3. The rack or grate is formed of parallel slats $b'$, attached to a frame, $b^2$, as shown in Fig. 3, the opening or space between the slats being only wide enough to allow the animal feeding to get hold of a small quantity of hay at a time. The parts of the grate B are held together and the grate held closed by the bolt C, which shuts into a hole formed in the front side of the case or box A for its reception.

The first or top table, D, is made to fit closely within the box or case A, so that the hay cannot pass between the edges of the table and the sides of the case or box A, as shown in Figs. 1 and 2. The upper surface of this table is made oval and it is perforated with numerous holes, so that the hay-seed and dust from the hay may pass down into the lower part of the box or case A. This table D slides up and down within the box or case A, and is kept always in a horizontal position by guides E, attached to its lower surface and sliding along the sides of the case A.

To the under side of the table D is attached the upper end of a spring, F, the lower end of which is attached to the upper surface of the second table, G, as shown in Fig. 1. This table G is also perforated, and its upper surface grooved, these grooves becoming deeper as they approach the holes, so that the hay-seed and dust from the hay may find their way into the lower part of the rack. It is also notched on its edges to allow the guides E to pass it when the table D is pushed down.

To the lower side of the table G are attached guides H, sliding along the sides of the case A, and keeping the table G in a horizontal position while moving up or down. It is also notched on its front edge, as seen in Figs. 1 and 4, to enable it to pass the spring I.

To the under side of the table G and to the upper side of the table J is attached the spring K. The table J is perforated and its upper surface grooved for the passage of the hay-seed and dust to the lower part of the case A. Its edges are notched for the passage of the guides E and H, and to enable it to pass the spring I, and to it are attached guides L, to keep it in proper position while moving up and down in the box A, as shown in Figs. 1 and 5.

M is a spring attached to the under side of the table J and to the bottom of the case A, as seen in Fig. 1.

In using the rack the stick N is inserted between the bars or slats $b'$ of the rack or grate B, and the tables D, G, and J pushed down, compressing the springs F, K, and M until the table D has been caught and held by the spring I, attached to the side of the case A for that purpose. The grate or rack B is then opened and the hay placed in the box A upon the table D. The grate is then shut down and bolted, and the table D released from the spring I by pulling upon the strap O, attached to the said spring I and extending through the front side of the case, A, as seen in Fig. 1. The elasticity of the springs forces the hay up against the rack or grate B, so that it can be reached by the animal feeding.

P is a door formed in the lower part of the box or case A for convenience in removing the hay-seed and dust from the lower part of the said box A when desired.

R are ears attached to the corners of the box or case A, by means of which the rack may be secured in place and protected from being overturned by the animal feeding.

S is a cover, which is made to fit over the grate B of the rack, and is secured in place by an arm or catch attached to its rear edge and fitting into a notch formed in the wall or walls to which the rack is attached, so that the said cover S cannot be removed by the animal. This cover is designed to be used when the animal is done feeding, to prevent the hay from being pulled from the rack and wasted.

It should be observed that a greater or less number of tables and springs may be used than three; but that is the number I prefer.

I claim as new and desire to secure by Letters Patent—

An improved horse hay-rack constructed and arranged substantially as herein described, and for the purposes set forth.

THOMAS MOORE.

Witnesses:
M. M. LIVINGSTON,
JAMES T. GRAHAM.